Dec. 1, 1942. W. J. MILLER 2,303,889
APPARATUS FOR MANUFACTURING POTTERY WARE
Original Filed May 24, 1938

INVENTOR.
WILLIAM J. MILLER
BY
George J. Croninger
ATTORNEY.

Patented Dec. 1, 1942

2,303,889

UNITED STATES PATENT OFFICE 2,303,889

APPARATUS FOR MANUFACTURING POTTERY WARE

William J. Miller, Swissvale, Pa.

Original application May 24, 1938, Serial No. 209,667. Divided and this application December 2, 1940, Serial No. 368,142

9 Claims. (Cl. 25—105)

This invention relates to methods and apparatus for the manufacture of pottery ware. This application is a division of my co-pending application for United States Letters Patent, Serial No. 209,667, filed May 24, 1938.

This invention has to do with improvements in and for trimming, an operation in the manufacture of jiggered pottery ware which occurs incident to the profiling step and is for the purpose of removing excess or accumulated clay or scrap from the verge or brim zone of the mold. The trimming operation occurs whilst the clay is in a plastic state and coincident with or just following the profiling operation and prior to drying as distinguished from subsequent tooling operations which are performed upon the dried body preparatory to dipping and firing.

The object of this invention is to provide a trimming device having the capacity to trim either hollow ware or flat ware. One advantageous feature of this invention is that the trimmer is capable of adjustment to move in various planes and directions to accommodate the work. Also, adjustments may be quickly and easily made in order to change over from one type of ware to another.

This invention contemplates both blade and wire trimming provisions adapted for the trimming of all classes of round jiggered pottery ware customarily made on automatic jiggering machinery, viz: hollow ware and flat ware. One embodiment of the invention comprehends a trimmer assembly adaptable to either flat ware or hollow ware operations with provisions for moving the same into and out of engagement with the work incident to each cycle; the invention also comprehends the locating of the trimming instrumentality at the proper working level in response to co-operation of the trimmer with the work, this self adjustable feature being extremely advantageous in avoiding damage to the molds and trimmer together with provisions for insuring that the proper pressure is applied to complete the work in satisfactory fashion.

Figure 1:
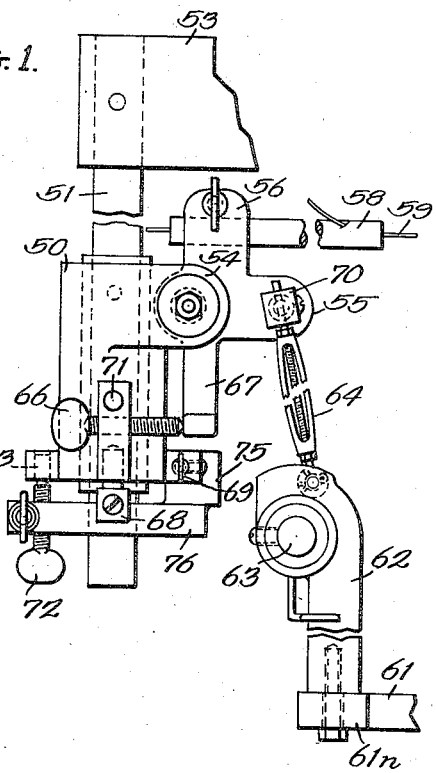
Fig. 1 is a side elevation of a wire trimmer arrangement with actuating means therefor.

In the manufacture of jiggered pottery ware, after the ware is profiled, the clay is trimmed from the brim and exposed portions of the mold which during the profiling operation have become coated with clay.

In Figs. 1 to 5, inclusive, I have shown a trimmer arrangement adaptable for both flat ware and hollow ware which comprises a body portion 50 which is bored and mounted on a rod 51 suspended from the lintel 53 of the machine adjacent the profile (not shown). The ears 54 rotatably support a frame 55 comprising a split clamp 56 in which a holder 58 for the trimmer wire 59 is slidably positioned. This holder is in the form of a length of rod stock having a bore 60 at each end opening into the circumferential surface of the rod at a point spaced inwardly from the ends, thereby forming a conduit in which the trimming wire is inserted and allowed to project beyond the ends of the openings. If desired, the bores may be made on a radius to provide for frictional securing engagement between the wire and wall of the bore or a plug may be inserted to hold the same. As the wire wears the shortened length can be extended by feeding more wire into the conduit and since trimmers are arranged at each end of the rod, it may be reversed to facilitate reloading without appreciable loss of time.

Figure 2:
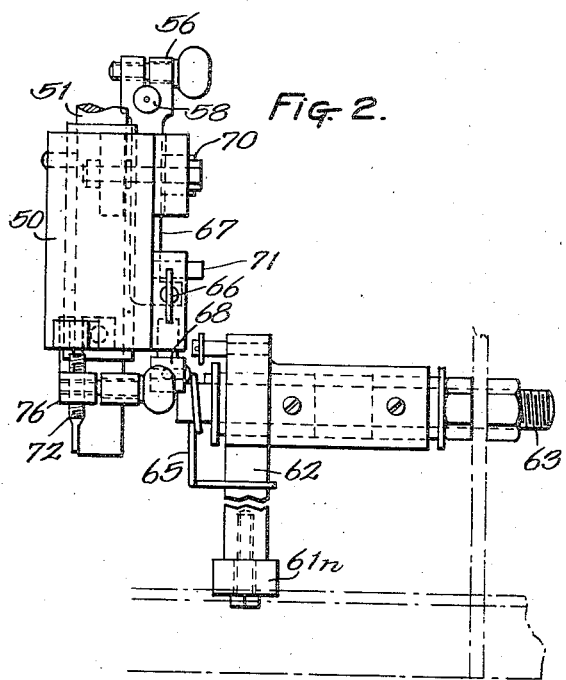
Fig. 2 is a front elevation of the arrangement of Fig. 1.

The trimmer is vertically reciprocated to move the wire into and out of engagement with the work by means of a cam 61 which actuates an arm 62 mounted on shafts 63, Fig. 2, between which a connection is had with the mounting 55 by turnbuckle 64. The cam follower is returned by spring 65. The extent of reciprocation is controlled by adjustable stop (thumb screw) 66 which engages with a stop 67. Thus far, the trimmer as described is adapted for trimming hollow ware.

In case it is desired to trim flat ware, the turnbuckle 64 is disconnected from the mounting 55 and connected to the pin 68 on the base of the sleeve 50. Thus, when arm 62 is oscillated the sleeve 50 is rotated about a vertical axis (rod 51) thus causing the trimmer wire to move in a horizontal, rather than a vertical, arc into and out of working position. The angle of inclination and vertically lowermost position of the trimmer can be controlled by the adjustment of thumb screws 66 and to provide for a resilient engagement of the wire with the mold, a spring 68a is connected, Fig. 4, between the pivot block 70 and a pin 71 located on the side of the sleeve. Thus, the level at which the trimmer wire operates is variable depending on the mold and is automatically adjustable to accommodate variations in mold brim height.

Before the sleeve 50 can be rotated however, it is necessary to drop the indexing pin 72 out of the hole 73 in the bottom of the sleeve. This normally holds the sleeve against rotation when the trimmer is operating on hollow ware.

Figure 3:
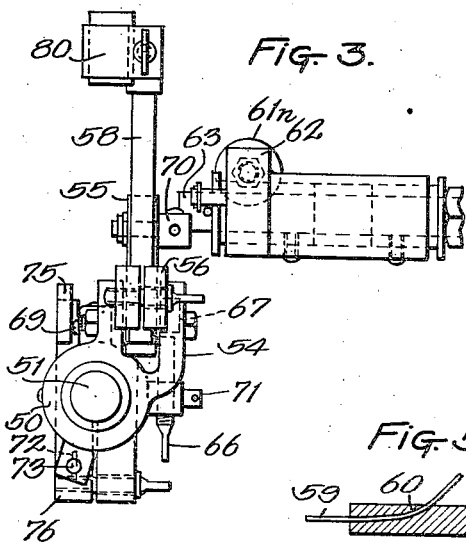
Fig. 3 is a top plan view of the arrangement of Figs. 1 and 2.
Figure 4:
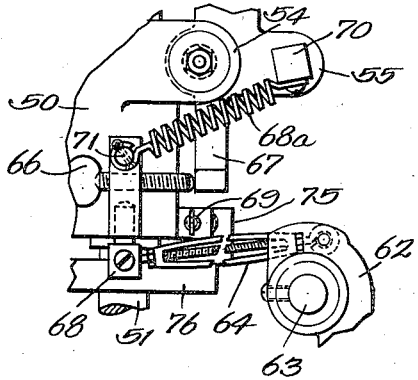
Fig. 4 is a fragmentary detail illustrating the relocation of driving connections in converting the trimmer of Fig. 1 from hollow ware to flat ware.
Figure 5:
Fig. 5 is a fragmentary detail in section showing the trimmer wire support of Fig. 1.

The range of movement of the trimmer is controlled for flat ware by the stop member 69, Fig. 3, which strikes an abutment 75 on the split clamp member 76. The entire assembly may be raised or lowered by unloosening the clamp 76 and shifting the same up or down.

There are various holders which may be employed in this type of trimming device such as for instance the one shown in Fig. 3. This is an extension device which has a split clamping member 80 in which the holder 58 may be mounted.

In the case of any of the reciprocating or rotating trimmers disclosed herein, the same may be operated from other parts of the machine than the cam 61 shown or bar 22d as long as the movement thereof is timed correctly with the operation cycle.

With reference to Fig. 1, the turnbuckle 64 may also be replaced by a spring such as that shown at 68a in making a drive connection between the pivot block 70 and the arm 62. This would provide for a resilient application of the trimmer wire to the work, the setting of lowest position then being through screw 66, and would also enable the wire to follow any irregularities in the brim surface of the mold without cutting or scratching the same.

The wire of which the trimmer is composed is preferably made of a metal alloy that is highly resistant to the abrasive action of clay.

With regard to Figure 3, 80 is a support on which the trimming device is rotatably and slidably mounted. Set screws 81 are for securing the device in adjusted position thereon. The posts 82, which have the wire clamps attached to the lower terminals are slidably and rotatably mounted in the bosses 83. Set screws 84 are for securing the posts in adjusted position.

Having thus described my invention what I claim is:

1. A dual purpose trimmer for trimming the edge portion of hollow or flat pottery ware comprising, in combination, a member rotatable about a vertical axis, a member rotatable about a horizontal axis, a trimmer supported by said members and operating means for moving one of said members independently of the other or both in unison.

2. A dual purpose device for trimming the edge surface of hollow or flat pottery ware comprising, in combination, a trimmer, a pair of relatively movable members pivotally connected together, one of said members comprising a sleeve and the other comprising an oscillatable member having a clamp for the reception of the trimmer and means including a connecting member capable of being attached to either of said members for actuating said members.

3. A dual purpose device for trimming the edge surface of hollow or flat pottery ware comprising, in combination, a pair of relatively movable members pivotally connected together, one of said members comprising a rotatable sleeve and the other comprising an oscillatable member having a clamp for the reception of a trimming tool holder and operating means including a cam and a detachable connecting member and means whereby said connecting member may be interconnected between said cam and either said sleeve or said oscillatable member for actuating said trimmer in different directions.

4. In a device for trimming the edge portion of hollow or flat pottery ware, a pair of relatively movable members pivotally connected together, a support for said members, means for adjusting said members thereon to various heights, means for locking one of said members thereon against movement relative thereto, a clamp associated with one of said members, a holder removably mounted in said clamp, a trimmer carried by said holder and operating means for oscillating either one or both of said members.

5. In combination with a support, a device for trimming hollow or flat pottery ware comprising, a pair of relatively movable members pivotally connected together, one of said members being slidably and rotatably mounted on said support, an adjustable stop for each of said members, and operating means common to both of said members and capable of being connected to either one for actuating said members in different directions, there being a tool holder with a trimming tool demountably secured to one of said members.

6. In combination with a support, a device for trimming hollow or flat pottery ware comprising, a pair of relatively movable members pivotally connected together, one of said members being slidably and rotatably mounted on said support, the other of said members having a clamp for a tool holder, a tool holder with trimming tool adjustably secured in said clamp, resilient means connected to said members and operating means for actuating said members including a cam and an adjustable connecting element and means associated therewith and with the members whereby said element may be connected with either of said members.

7. Pottery trimming apparatus comprising a support, a member mounted on said support for oscillation about and for adjustment in a direction parallel to an axis, a second member mounted on the first member for oscillation about an axis at an angle to the first axis, a clamp on said second member for holding a trimming instrument, releasable means for holding one of said members from oscillating and means for oscillating one of said members.

8. Pottery trimming apparatus comprising a support, a member mounted on said support for oscillation about and for adjustment into positions along an axis, a second member mounted on the first member for oscillation about an axis at right angles to the first axis, a trimming instrument carried by one of said members, releasable means for holding either member from oscillating and means for oscillating either one of said members when the other is held by said holding means.

9. Pottery trimming apparatus comprising a support, a member mounted on said support for oscillation about and for adjustment relative to an axis, a second member mounted on the first member for oscillation about an axis at an angle to the first member, a trimming instrumentality carried by one of said members, and cam actuated means for oscillating either one of said members to effect traversing of the trimmer with respect to the work.

WILLIAM J. MILLER.